July 10, 1962     E. A. GLASSEY     3,043,144
TEMPERATURE COMPENSATOR FOR MANOMETERS WITH SERVO-FOLLOWERS
Filed Aug. 29, 1960     2 Sheets-Sheet 1

INVENTOR.
EUGENE A. GLASSEY
BY
ATTORNEYS

July 10, 1962     E. A. GLASSEY     3,043,144
TEMPERATURE COMPENSATOR FOR MANOMETERS WITH SERVO-FOLLOWERS
Filed Aug. 29, 1960     2 Sheets-Sheet 2
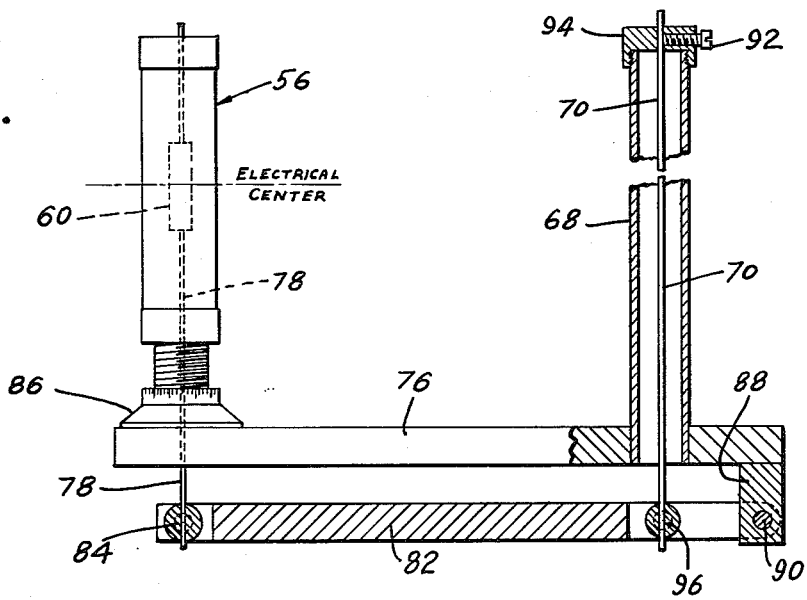
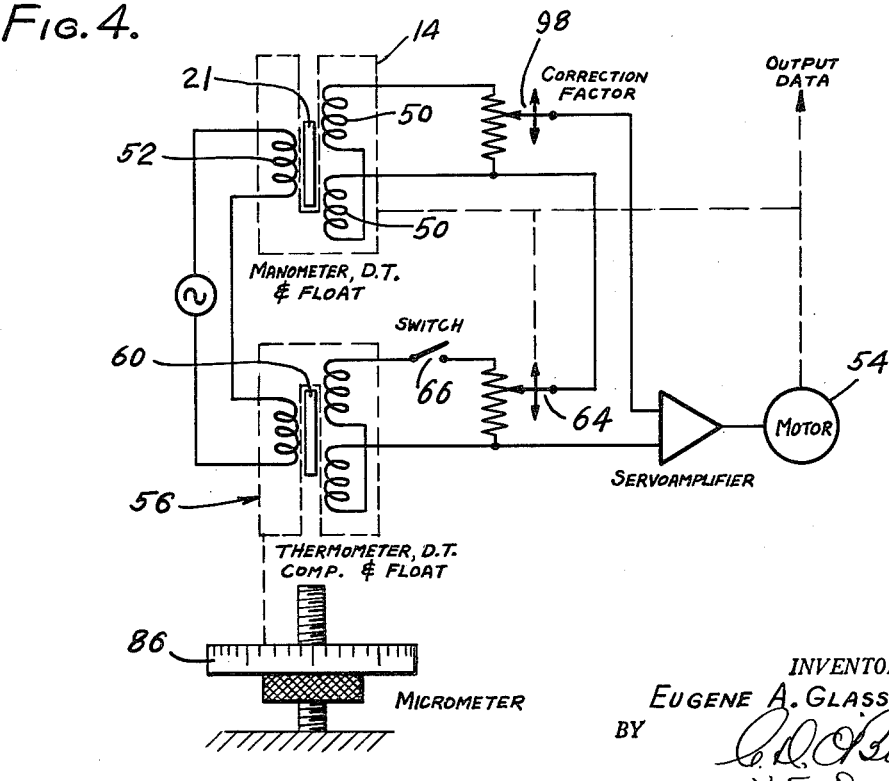
INVENTOR.
EUGENE A. GLASSEY
BY
ATTORNEYS United States Patent Office 3,043,144
Patented July 10, 1962

3,043,144
TEMPERATURE COMPENSATOR FOR MANOMETERS WITH SERVO-FOLLOWERS
Eugene A. Glassey, 5545 Eva Ave., Los Altos, Calif.
Filed Aug. 29, 1960, Ser. No. 52,744
3 Claims. (Cl. 73—401)
(Granted under Title 35, U.S. Code (1952), sec. 266)

The invention described herein may be manufactured and used by or for the Government of the United States of America for governmental purposes without the payment of any royalties thereon or therefor.

This invention relates to liquid level measuring devices, more particularly, it relates to automatic liquid level indicating devices wherein corrections of the liquid level are automatically made to temperatures other than ambient.

Manometric devices for automatically measuring pressures by sensing the level of liquid in a column movably responsive to changes in barometric pressure are available. A device of this type is described in U.S. Patent No. 2,357,745 to Waldo H. Kliever granted Sept. 5, 1944. Apparatus for automatically transmitting the readings of a device of the type disclosed in the above Kliever patent is described in my copending U.S. patent application, Serial No. 32,497 filed in the U.S. Patent Office on May 27, 1960. A device of this type is useful for transmitting continuous atmospheric recordings from unattended weather stations to a central station. A disadvantage of the above type devices is the fact that all pressure readings are based on ambient temperatures and it is necessary to convert the readings to a standard temperature for comparative and other purposes. This procedure requires mathematical calculations and the use of reference tables and, accordingly, is quite time consuming where a large number of readings are involved.

Thermostatically controlled devices have been employed in the past to maintain the instrument at a finite temperature, but it may be shown that the device of this invention is more accurate, may be constructed as a simpler mechanical device and does not subject components to elevated temperatures. Exposure of components to elevated temperatures reduces life and reliability as thermostatically controlled cabinets must be controlled at a temperature equal to or higher than the maximum anticipated ambient.

It is therefore an object of this invention to provide a liquid level indicating device which automatically converts liquid level readings at one temperature to readings at another temperature.

The invention will be described in its application as an atmospheric pressure indicating device. Obviously, it is not limited to this application as it can be used in other applications wherein liquid level measurements corrected to a required temperature other than ambient are required.

The present invention comprises a liquid level indicating device of the type disclosed in the above-referred-to patent and copending application modified to provide liquid level readings automatically corrected to temperatures other than ambient.

The invention will be described with reference to the accompanying drawings wherein like numerals represent like parts and in which, FIG. 1 is a perspective view of the device of the invention;

FIG. 3 is a plan view partially in section of the temperature indicating element of the device, and FIG. 4 is a schematic diagram of the circuit components of the invention.

Figure 1:
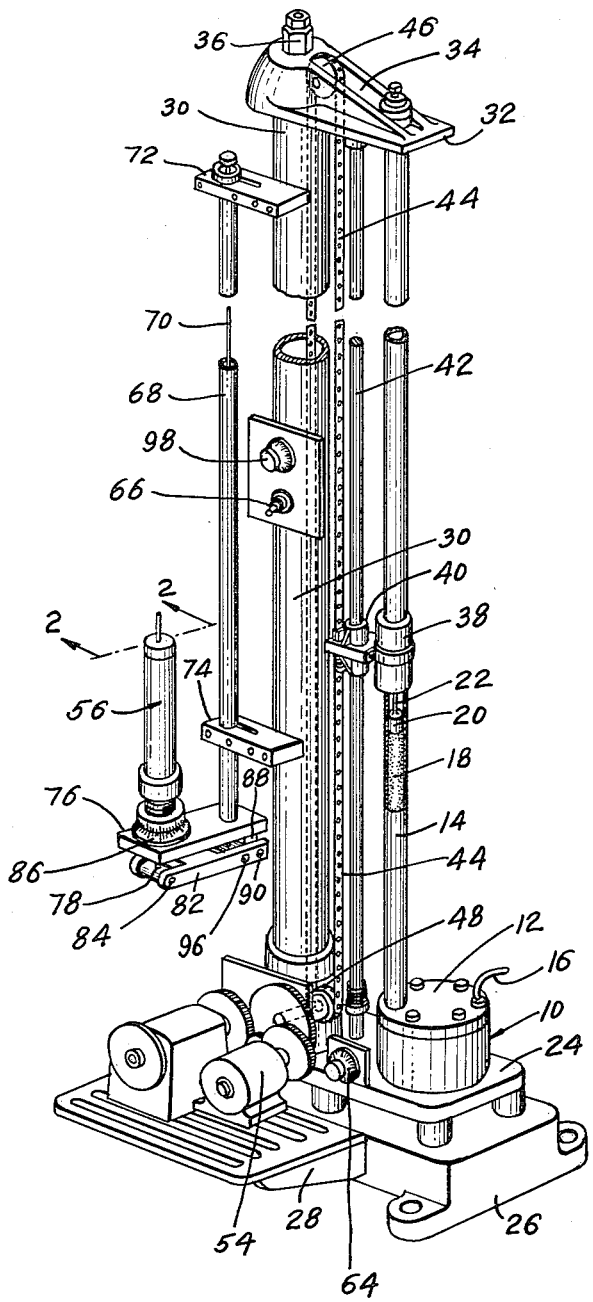

Referring now to FIG. 1, there is shown at 10 a mercury barometer comprising cistern 12 and tubular member or manometer tube 14.

The cistern 12 is provided with inlet tube 16 for providing an access to the atmosphere. The cistern is filled with a suitable liquid, in this instance mercury, and a column of mercury 18 is supported in the evacuated tubular member 14 by the atmosphere, the bottom end of the tubular member extending beneath the surface of the mercury in the cistern, as is well known in the art. A float 20 of nonmagnetizable material supporting an armature member 21 (FIG. 4) of suitable magnetizable material by means of elongated stem 22 is carried by the column of mercury 18. This float and armature construction is fully disclosed in my above-referenced copending application. As shown, the barometer 10 is mounted on platform 24 supported by stand 26 having wing 28 attached thereto. A hollow support column 30 having a top support flange 32 is anchored in the platform 24. Flange 32 is constructed with channel 34 and is held in place over the top of column 30 by nut 36. The top of tubular member 14 is supported in channel 34 of flange 32 as shown. A housing 38 is movably mounted on manometer tube 14 and is integral with connector element 40 which is movably mounted on support rod 42 supported between platform 24 and flange 32 as shown. Connector element 40 is attached to a chain or perforated steel tape 44 which is linked into sprockets 46 and 48. It is thus seen that movement of the chain serves to move the housing 38 vertically on the manometer tube 14. Housing 38 encloses two identical vertically spaced induction coils 50 and 52 (FIG. 4). These coils form two arms of a bridge circuit in the form of a differential transformer as can be seen from FIG. 4. The system is balanced when the differential transformer is electrically centered relative to the armature. Sprocket 48 is connected through a gear train with two phase reversible electric motor 54. As can be seen by inspection of FIG. 1 and the schematic diagram of FIG. 4, and as more fully explained in the above-referred-to patent, movement of the liquid column due to changes in atmospheric pressure results in a corresponding movement of the armature to unbalance the bridge circuit. This unbalance results in a current through the motor 54 having a phase to drive the motor in a direction to restore the balance of the bridge circuit. The amount of current required to restore the balance of the bridge, or some reference movement of the motor or coils, can be used to electrically reflect the change, by means of a digital encoder, for example, in atmospheric pressure and this change transmitted by means of conventional transmitting means to a central recording station.

The above construction and operation are disclosed in the above-referred to patent and copending application. The novel feature of the present invention by which readings at ambient temperatures are automatically converted to readings at a desired temperature will now be explained.

In the basic balance principle as set forth in the above-mentioned patent and as shown in FIG. 4 in combination with the temperature compensation feature, the secondary windings of the differential transformer are connected in subtractive series so that the differential transformer output at balance is zero. If an A.C. potential of the same phase as the differential transformer signal is introduced in series with its output, the servo balance point will be displaced. Under this condition the balance position is shifted proportionately to the relative magnitude of the second signal. For the temperature compensation a second signal is introduced which is the product of the temperature difference (ΔT) from a selected reference temperature and the height (ΔH) of the liquid column. The product (ΔTΔH) is proportional to the correction and the differential transformer is displaced accordingly. In practice, this technique is employed by a simple means that permits the instrument to be set for continuous operation to refer readings to a selected temperature, for example 0° C. This is accomplished by a precise four-step operation using two controls and standard handbook data. A temperature sensing element and differential transformer provide the ΔT signal. This signal is fed to a precision potentiometer that is positioned by the servo, so that the potentiometer output is ΔTΔH. This voltage is added in series with the output of the manometer differential transformer, the sum of which is fed to the servo-amplifier and nulled to zero at balance. A second manually adjusted potentiometer is provided for setting the relative magnitude of the compensation. A switch is provided on the thermometer differential transformer output so that the correction may be switched out. This causes the servo to rebalance to the uncorrected position permitting a check to be made on the correction magnitude.

Figure 2:
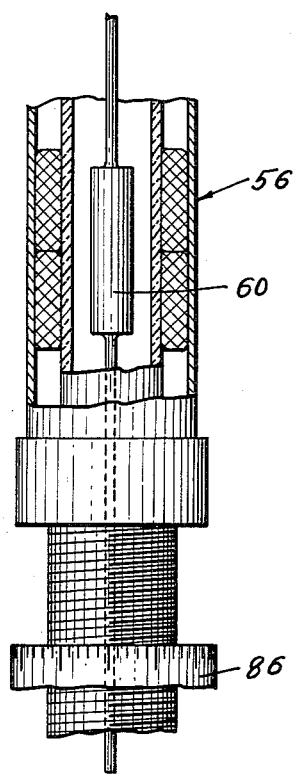
FIG. 2 is a partial vertical section on the line 2—2 of FIG. 1.

Referring now to FIGS. 1 and 4, a second differential transformer 56 (FIG. 2) referred to in FIG. 4 as a thermometer DT is connected in series with the manometer DT. The term "thermometer," of course, includes any temperature sensing device. The thermometer DT is provided with armature 60. A linear precision potentiometer 64 is connected to the secondary windings of the thermometer DT so it can be switched in and out by switch 66. The thermometer DT 56 in conjunction with potentiometer 64 supplies a signal proportional to the temperature change times the liquid column height. The armature 60 is moved in response to temperature change by the following construction. Temperature changes are sensed by the differential expansion of aluminum alloy tube 68 (FIG. 3) and invar rod 70 positioned at the center of the tube. This combination of metals is not critical and other suitable combinations may be used. The tube and rod are supported on support column 30 by blocks 72 and 74 as shown in FIG. 1. A mechanical multiplying linkage translates the differential expansion of rod and tube to movement of the armature 60.

Reference is now made to FIG. 3 for the detailed construction of the temperature compensation linkage. Platform 76 is secured at one end to aluminum alloy tube 68 by welding or otherwise. Differential transformer 56 is mounted on the other end of platform 76. Connecting rod 78 of nonmagnetic material supports the armature 60 centrally of the DT 56. The connecting rod 78 is mounted for vertical movement and extends through the DT casing and plate 76 for attachment to one end of lever arm 82 at pivot point 84. A micrometer 86 is suitably attached to the DT 56 to permit manual adjustment thereof vertically. Lever arm 82 is pivotally attached at its other end to end block 88 at pivot point 90. Invar rod 70 is fixedly attached at one end by set screw 92 to cap 94 secured on the top of tube 68. Invar rod 70 is pivotally attached at its other end to lever arm 82 at pivot point 96 located between pivot points 84 and 90. It will be seen from this construction that differential expansion of tube 68 and rod 70 due to temperature changes will be translated through lever arm 82 and the accompanying linkage to movement of armature 60. For this particular arrangement the ratio of the multiplying linkage just described equals the ratio of the coefficient of expansion of the mercury column less that of the steel of the perforated tape to the coefficient of expansion of the aluminum alloy less that of invar. A modification of the invention includes a liquid filled "thermometer" with a float to sense temperature changes.

The temperature sensing construction and the temperature DT provide the ΔT signal. This signal is multiplied by the manometer column height by potentiometer 64 to give the product ΔTΔH. This product is multiplied by the correction factor by means of potentiometer 98 which can be manually adjusted to set in the correction factor. The resulting product voltage is added in series with the output of the manometer DT 38 and nulled to zero the balance. The correction may be switched out at any time by means of switch 66.

As an aid in understanding the calibration and operation of the device of the invention the following example is presented:

(1) With instrument zeroed and operating, adjust pressure on cistern orifice to produce 32" manometer reading in 32" range instruments. Close switch 66 and adjust micrometer 86 to obtain same reading on manometer as with switch 66 open. The armature of the compensator DT 38 is now electrically centered at the prevailing ambient temperature.

(2) With switch 66 closed turn the micrometer dial 50 units (for example) in a direction to decrease the manometer counter reading if the corrected temperature is below ambient and in the opposite direction if it is above ambient. Adjust potentiometer 98 to produce the same displacement on the counter of the manometer DT 38 as the micrometer has been moved. With this step the magnitude of the output of the compensator DT 56 has been set to equal that of the manometer DT 38. As a final step, the micrometer is set to a calculated value to correspond to the correction at the prevailing ambient temperature. In actual practice the instrument corrections may be inserted on directly calibrated controls or corrective data taken from supplied graphs, avoiding the need for calculated data as mentioned above.

It will be apparent from the above description that many modifications are possible in the light of the above teaching. It is, therefore, to be understood that within the scope of the appended claims the invention may be practiced otherwise than as specifically described herein.

What is claimed is:

1. Apparatus for measuring the level of a column of liquid corrected to a selected temperature other than ambient, comprising, a first electrically balanced bridge circuit including two vertically arranged hollow inductive windings; a first armature arranged to reciprocably move inside said windings to control the balance of said first bridge circuit, said armature being supported by a float on said column of liquid responsive to the movement of the liquid; means for measuring the unbalance of said first bridge circuit including a servo system responsive to change in column height; a second bridge circuit including two vertically arranged hollow inductive windings; a second armature arranged to reciprocably move in the hollow of said windings to control the balance of said second bridge circuit; a connecting rod connected at one end to the bottom of said second armature and extending below said windings and being vertically reciprocable; a hollow metal tube vertically supported substantially parallel to the plane of movement of said second armature and anchored against movement at its lower end; a rod-like metal element in the hollow of said tube having a coefficient of expansion different from that of said tube fixedly secured by one end at the top of said tube and extending below the point at which said tube is anchored; a lever pivotally connected at one end to the other end of said connecting rod and pivotally connected at a point between its ends to the other end of said metal element; said lever being pivotally anchored at its other end and connected to said tube and metal element to transmit differential movement of said tube and metal element due to temperature changes to move said armature by means of the linkage of connecting rod, lever and metallic element to unbalance said second bridge circuit by an amount of voltage proportional to the temperature change, said linkage being a multiplying linkage having a ratio equal to the ratio of the coefficient of expansion of said liquid to that of the metal of the element; a first potentiometer positioned by said servo system and associated with said second bridge circuit for electrically multiplying said temperature induced unbalance voltage of said second bridge circuit by the liquid height electrical analog voltage to give a correction voltage proportional to the temperature induced change in column height; means for subtractive combination of said correction voltage and the electrical unbalance voltage of said first bridge circuit to develop a difference voltage proportional to the column height corrected to a selected temperature; and a second potentiometer associated with said first bridge circuit for gain control of the column height responsive servo system.

2. An atmospheric pressure indicating device, comprising, a tubular member containing a column of mercury supported by atmospheric pressure and movably responsive thereto; a float on the surface of the mercury movable therewith; a first magnetizable core carried by said float; an electrically balanced bridge circuit; a first pair of vertically spaced hollow inductive windings surrounding said tubular member and movable with respect thereto, said windings forming a part of said bridge circuit, said first magnetizable core arranged to reciprocably move in the hollow of said first pair of inductive windings to vary the impedance of said first pair of windings and thereby unbalance said first bridge circuit upon movement of the level of said liquid; means for measuring the unbalance of said first bridge circuit including a servo system, said servo system including a two-phase electric motor operative to move said windings by means of a metal belt to restore the balance of said circuit and meter means for indicating the amount of movement of said liquid level; a second bridge circuit including a second pair of vertically arranged hollow inductive windings; a second magnetizable core arranged to reciprocably move in the hollow of said second pair of windings to vary the impedance of said second bridge circuit and thereby control its balance; a connecting rod connected at one end to the bottom of said second magnetizable core and extending below said second pair of windings and being vertically reciprocable; a base; said second pair of windings being supported on said base substantially perpendicular thereto, said connecting rod extending through said base; a hollow metal tube vertically supported on said base and anchored against movement at its lower end; a metal rod in the hollow of said metal tube having a coefficient of expansion different from that of the metal of said tube fixedly secured by one end at the top of said tube and extending through said base, said rod being vertically reciprocable; a lever pivotally connected at one end to the other end of said connecting rod and pivotally connected at a point between its ends to the other end of said metal rod; said lever being pivotally anchored at its other end and connected to said tube and metal rod to transmit differential movement of said tube and metal rod due to temperature changes to move said second magnetizable core by means of the linkage of connecting rod, lever and metal rod to unbalance said second bridge circuit by an amount of potential proportional to the temperature change; said linkage being a multiplying linkage having a ratio equal to the ratio of the coefficient of expansion of mercury less the coefficient of expansion of the metal of said metal belt to the coefficient of expansion of the metal of said tube less the coefficient of expansion of the metal of said metal rod; a first potentiometer positioned by said servo system and associated with said second bridge circuit for electrically multiplying said temperature induced unbalance voltage of said second bridge circuit times the liquid column height electrical analog voltage to give a correction voltage proportional to the temperature induced change in column height; means for subtractive combination of said correction voltage and the electrical unbalance voltage of said first bridge circuit to develop a difference voltage proportional to the column height corrected to a selected temperature; a second potentiometer associated with said first bridge circuit for gain control of the column height responsive servo system.

3. In combination, apparatus for measuring pressure by means of a column of liquid and wherein compensation is made for temperature effects on said column, said combination comprising a manometer type column of nonmagnetic material containing liquid, a float on the top of said liquid, a first armature within said column movable with said float, a first differential transformer having its secondaries wound in subtractive series around said column and having its field affected by the position of said first armature, a temperature responsive device comprising a base, a first length of a first metal and a second length of a second metal having a different coefficient of expansion than said first metal, a lever fulcrumed to said first length at a first point, said second length being connected to said lever at a second point remote from said first point, a second armature connected for movement with said lever at a third point remote from said first and second points, said first and second lengths being fixed relative to said base at their ends remote from said lever, a second differential transformer having its secondaries wound in substractive series having its field affected by the position of said second armature, means for energizing the primary coils of said transformers, a first potentiometer receiving the output signal of the secondaries of said first transformer, a second potentiometer receiving the output signal of the secondaries of said second transformer, said second potentiometer having an adjustable contact, said potentiometers being connected in series with each other and with an amplifier, a servomotor driven from said amplifier, a metallic driving means driven by said servomotor, said driving means being connected to move said adjustable contact of said second potentiometer and an indicator, the ratio of the difference between the distance between the first and second points to the distance between the first and third points being equal to the ratio of the difference between the coefficients of expansion of said liquid and said metallic driving means to the difference between the coefficients of expansion of said first metal and said second metal.

References Cited in the file of this patent
UNITED STATES PATENTS

| | | |
|---|---|---|
| 1,672,229 | Pairman | June 5, 1928 |
| 2,050,965 | De Giers | Aug. 11, 1936 |
| 2,363,690 | Razek | Nov. 28, 1944 |
| 2,553,291 | Barr | May 15, 1951 |
| 2,715,705 | Barstow et al. | Aug. 16, 1955 |
| 2,722,641 | Cross | Nov. 1, 1955 |

OTHER REFERENCES

Exactel Servomanometers, Bulletin 500—1959 Edition. (Received in U.S. Patent Office Dec. 15, 1958), a publication by Exactel Instrument Company, 5545 Eva Avenue, Los Altos, California. (Copy in Div. 36) 73—401.